US012732932B2

(12) United States Patent
Rysgaard et al.

(10) Patent No.: US 12,732,932 B2
(45) Date of Patent: Sep. 8, 2026

(54) METHOD FOR UE PERFORMING MEASUREMENTS WITHOUT SPARE RF CHAIN

(71) Applicant: Nokia Technologies Oy, Espoo (FI)

(72) Inventors: Bent Henneberg Rysgaard, Aalborg (DK); Rafael Cauduro Dias de Paiva, Aalborg (DK); Jürgen Hofmann, Munich (DE)

(73) Assignee: Nokia Technologies Oy, Espoo (FI)

( * ) Notice: Subject to any disclaimer, the term of this patent is extended or adjusted under 35 U.S.C. 154(b) by 389 days.

(21) Appl. No.: 18/427,628

(22) Filed: Jan. 30, 2024

(65) Prior Publication Data

US 2024/0284359 A1 Aug. 22, 2024

Related U.S. Application Data

(60) Provisional application No. 63/446,118, filed on Feb. 16, 2023.

(51) Int. Cl.

| | |
|---|---|
| ***H04W 56/00*** | (2009.01) |
| ***H04L 5/00*** | (2006.01) |
| ***H04W 8/22*** | (2009.01) |
| ***H04W 76/20*** | (2018.01) |

(52) U.S. Cl.

CPC ....... *H04W 56/0015* (2013.01); *H04L 5/0051* (2013.01); *H04W 8/22* (2013.01); *H04W 76/20* (2018.02)

(58) Field of Classification Search

CPC ... H04W 56/0015; H04W 8/22; H04W 76/20; H04W 24/10; H04L 5/0051; H04L 5/0048

USPC ........................................ 370/464, 498, 503

See application file for complete search history.

(56) References Cited

U.S. PATENT DOCUMENTS

| | | | | |
|---|---|---|---|---|
| 2023/0284160 A1* | 9/2023 | Takahashi | ............ | H04L 5/0053 370/503 |
| 2024/0172018 A1* | 5/2024 | Cui | ....................... | H04W 24/10 |
| 2024/0297776 A1* | 9/2024 | He | ....................... | H04L 5/0053 |

OTHER PUBLICATIONS

Extended European Search Report received for corresponding European Patent Application No. 23216972.2, dated May 7, 2024, 8 pages.

"Running NR RRC CR for MUSIM", 3GPP TSG-RAN WG2 Meeting #116-e, R2-2111602, vivo, Nov. 1-12, 2021, pp. 1-961.

(Continued)

*Primary Examiner* — Obaidul Huq

(74) *Attorney, Agent, or Firm* — Barta Jones, PLLC

(57) ABSTRACT

An apparatus may be configured to: determine at least one parameter associated with measurement of at least one synchronization signal block (SSB), wherein the at least one parameter comprises at least one of: an indication of a time period between measurements of SSBs, an indication of a minimum time period between measurements of SSBs, an indication of a first time period to switch from measurement of an SSB to transmission, an indication of a second time period to switch from reception to measurement of the SSB, an indication of a third time period to switch from measurement of the SSB to reception, or an indication of a fourth time period to switch from transmission to measurement of the SSB; and transmit, to a network entity, the at least one parameter related to a switching time between measurement and transmission or reception.

20 Claims, 12 Drawing Sheets

800 receive, from a user equipment, at least one parameter, wherein the at least one parameter is associated with measurement of at least one synchronization block, wherein the at least one parameter comprises at least one of:

an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block

810 determine at least one resource grant for the user equipment based, at least partially, on the at least one parameter related to a switching time between measurement and transmission or reception

820

(56) References Cited

OTHER PUBLICATIONS

"3rd Generation Partnership Project; Technical Specification Group Radio Access Network; NR; Requirements for support of radio resource management (Release 17)", 3GPP TS 38.133, V17.5.0, Mar. 2022, 607 pages.
"New WID: Further Enhancements on NR and MR-DC Measurement Gaps and Measurements without Gaps", 3GPP TSG RAN Meeting #95e, RP-221018, Agenda: 9.1.4.3, MediaTek Inc, Mar. 17-23, 2022, 4 pages.
"WF on NR_MG_enh2 Part 2", 3GPP TSG-RAN WG4 Meeting # 105, R4-2220360, Agenda: 8.10.4, Intel Corporation, Nov. 14-18, 2022, 9 pages.
"Revised WID on support of reduced capability NR devices", 3GPP TSG RAN Meeting #92e, RP-211574, Agenda: 9.7.1.7, Ericsson, Jun. 14-18, 2021, 6 pages.

* cited by examiner

| FIG. 4A | FIG. 4B | FIG. 4C | FIG. 4D |
|---|---|---|---|

410

SMTC

700 determine at least one parameter associated with measurement of at least one synchronization signal block, wherein the at least one parameter comprises at least one of:

an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block

710

transmit, to a network entity, the at least one parameter related to a switching time between measurement and transmission or reception

800 receive, from a user equipment, at least one parameter, wherein the at least one parameter is associated with measurement of at least one synchronization block, wherein the at least one parameter comprises at least one of:

an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block

810

determine at least one resource grant for the user equipment based, at least partially, on the at least one parameter related to a switching time between measurement and transmission or reception

METHOD FOR UE PERFORMING MEASUREMENTS WITHOUT SPARE RF CHAIN

CROSS-REFERENCE TO RELATED APPLICATION

This application claims the benefit of U.S. Provisional Application No. 63/446,118, filed Feb. 16, 2023. The entire content of the above-referenced application is hereby incorporated by reference.

BACKGROUND

It is known, in intra-frequency measurements or when a spare RF chain is available, to enable measurement without gaps.

FIELD OF EMBODIMENTS

The example and non-limiting embodiments relate generally to user equipments performing measurements and, more particularly, to measurement performed without gaps.

BRIEF SUMMARY OF EMBODIMENTS

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: determine at least one parameter associated with measurement of at least one synchronization signal block, wherein the at least one parameter comprises at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and transmit, to a network entity, the at least one parameter related to a switching time between measurement and transmission or reception.

In accordance with one aspect, a method comprising: determining, with a user equipment, at least one parameter associated with measurement of at least one synchronization signal block, wherein the at least one parameter comprises at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and transmitting, to a network entity, the at least one parameter related to a switching time between measurement and transmission or reception.

In accordance with one aspect, an apparatus comprising means for performing: determining at least one parameter associated with measurement of at least one synchronization signal block, wherein the at least one parameter comprises at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and transmitting, to a network entity, the at least one parameter related to a switching time between measurement and transmission or reception.

In accordance with one aspect, a non-transitory computer-readable medium comprising program instructions stored thereon for performing at least the following: determining at least one parameter associated with measurement of at least one synchronization signal block, wherein the at least one parameter comprises at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and causing transmitting, to a network entity, of the at least one parameter related to a switching time between measurement and transmission or reception.

In accordance with one aspect, an apparatus comprising: at least one processor; and at least one memory storing instructions that, when executed by the at least one processor, cause the apparatus at least to: receive, from a user equipment, at least one parameter, wherein the at least one parameter is associated with measurement of at least one synchronization block, wherein the at least one parameter comprises at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determine at least one resource grant for the user equipment based, at least partially, on the at least one parameter related to a switching time between measurement and transmission or reception.

In accordance with one aspect, a method comprising: receiving, from a user equipment, at least one parameter, wherein the at least one parameter is associated with measurement of at least one synchronization block, wherein the at least one parameter comprises at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determining at least one resource grant for the user equipment based, at least partially, on the at least one parameter related to a switching time between measurement and transmission or reception.

In accordance with one aspect, an apparatus comprising means for performing: receiving, from a user equipment, at least one parameter, wherein the at least one parameter is associated with measurement of at least one synchronization block, wherein the at least one parameter comprises at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determining at least one resource grant for the user equipment based, at least partially, on the at least one parameter related to a switching time between measurement and transmission or reception.

In accordance with one aspect, a non-transitory computer-readable medium comprising program instructions stored thereon for performing at least the following: causing receiving of at least one parameter, wherein the at least one parameter is associated with measurement of at least one synchronization block, wherein the at least one parameter comprises at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determining at least one resource grant for the user equipment based, at least partially, on the at least one parameter related to a switching time between measurement and transmission or reception.

According to some aspects, there is provided the subject matter of the independent claims. Some further aspects are defined in the dependent claims.

BRIEF DESCRIPTION OF THE SEVERAL VIEWS OF THE DRAWINGS

The foregoing aspects and other features are explained in the following description, taken in connection with the accompanying drawings, wherein:

FIG. 4B is a diagram illustrating features as described herein;

FIG. 4D is a diagram illustrating features as described herein;

FIG. 7 is a flowchart illustrating steps as described herein; and

FIG. 8 is a flowchart illustrating steps as described herein.

DETAILED DESCRIPTION OF EMBODIMENTS

Figure 1:
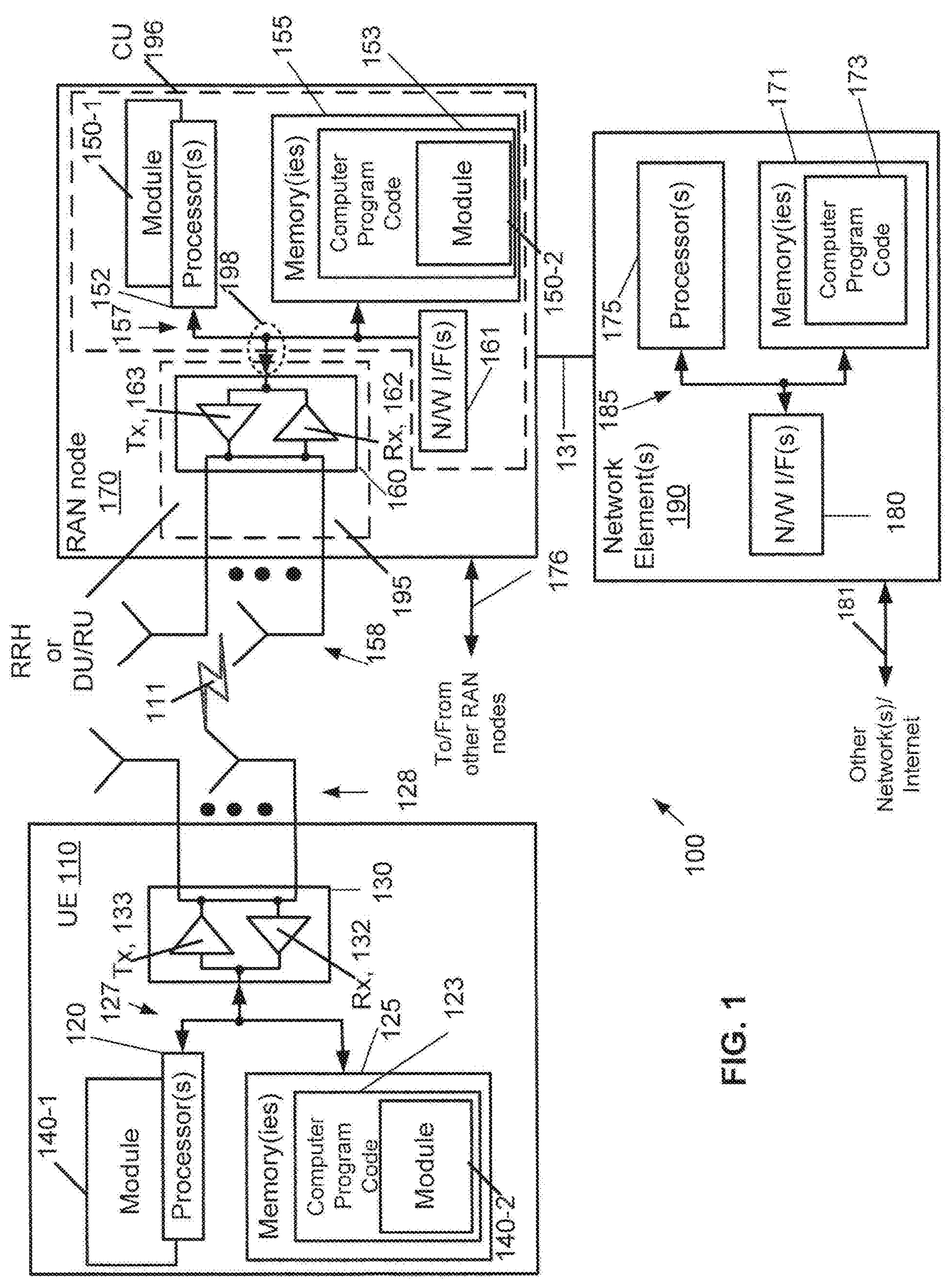
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
6G sixth generation
AMF access and mobility management function
BW bandwidth
CA carrier aggregation
CC component carrier
CRAN cloud radio access network
CSSF carrier-specific scaling factor
CSI-RS channel state information reference signal
CU central unit
DC dual connectivity
DU distributed unit
eMBB enhanced mobile broadband
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDD frequency division duplex
gNB (or gNodeB) base station for 5G/NR, i.e., a node providing NR user plane and control plane protocol terminations towards the UE, and connected via the NG interface to the 5GC
HD-FDD half-duplex frequency division duplex
HW hardware
IE information element
I/F interface
IoT Internet of Things
L1 layer 1
LTE long term evolution
MAC medium access control
ML measurement length
MME mobility management entity MPBM minimum period between measurements
MRST measurement to RX switching time
MTST measurement to TX switching time
MUSIM multiple universal subscriber identity modules
NCSG network controlled small gaps
ng or NG new generation
ng-eNB or NG-eNB new generation eNB
NR new radio
N/W or NW network
OFDM orthogonal frequency division multiplex
O-RAN open radio access network
PBM period between measurements
PDCCH physical downlink control channel
PDCP packet data convergence protocol
PDSCH physical downlink shared channel
PHY physical layer
PUCCH physical uplink control channel
PUSCH physical uplink shared channel
QAM quadrature amplitude modulation
RAN radio access network
RAT radio access technology
RedCap reduced capability
RF radio frequency
RLC radio link control
RMST RX to measurement switching time
RRC radio resource control
RRH remote radio head
RRT RF re-tuning
RS reference signal
RU radio unit
Rx/RX receiver
SCell secondary cell
SDAP service data adaptation protocol
SGW serving gateway
SMF session management function
SMTC SSB-based measurement timing configuration
SRS sounding reference signal
SSB synchronization signal block
TMST TX to measurement switching time
Tx/TX transmitter
UAI UE assistance information
UE user equipment (e.g., a wireless, typically mobile device)
UPF user plane function
VIL visible interruption length
VNR virtualized network function Turning to FIG. 1, this figure shows a block diagram of one possible and non-limiting example in which the examples may be practiced. A user equipment (UE) 110, radio access network (RAN) node 170, and network element (s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR), and/or 5G-Advanced (i.e. NR Rel-18 and beyond) and/or 6G. In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the FI interface connected with the gNB-DU. The FI interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree Cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. eRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein generally relate to UE measurements and scheduling. As part of NR_MG_enh2 in Rel-17, RAN4 is discussing enhancements for UEs to be able to perform measurements without gaps.

One of the enablers for the UE to support measurements without gaps is that it may have an available receiver that is not being used for other activities. That situation may arise when a UE is capable of receiving more component carriers than it is configured with by the gNB. In that situation, the vacant/spare Rx chain may be used for performing measurements without impacting the operation in the active component carriers. Even though the impact of using a vacant Rx chain is minimized on the active component carriers, there may still be some interruptions caused by radio frequency (RF) re-tuning (RRT). For that reason, it may be expected that certain UE architectures need some interruptions when performing measurements without gaps.

A similar approach was used for network controlled small gaps (NCSG), where a vacant RF chain is used for performing measurements, and a Visible Interruption Length (VIL) is used for accommodating the interruption due to RF re-tuning both before (VIL1) and after (VIL2) the measurement window (ML). Although the advantages of a vacant RF chain can already be used with NCSG, there are only a few NCSG patterns defined with a fixed configuration, such as a fixed VIL of 1 ms in FR1, that leaves no room for more flexibility and smaller interruptions that might be needed or supported by certain UE implementations.

The availability of a spare RF chain from the UE side may depends on its capability (i.e. the total number of chains available) as well as the configuration used by the network. In some UE architectures, the UE might include several RF chains in order to be able to support a given number of component carriers in carrier aggregation. Therefore, depending on the number of component carriers that are configured, the UE might have a spare RF chain. And for this reason, the capability to perform measurements without gaps may depend on the configuration of the UE.

One aspect that is not covered so far for measurements without gaps is the scenario in which the UE does not have a vacant RF chain. This is a relevant use case scenario for NR RedCap devices, introduced into Rel-17 (see WID in RP-211574), which have reduced capabilities versus NR enhanced mobile broadband (eMBB) capable UEs, as they are targeted to serve in IoT like scenarios, applying UE complexity reduction, and hence neither support of carrier aggregation (CA) nor or dual connectivity (DC) is mandated. RedCap UEs may have reduced capabilities such as: bandwidth (BW) of 20 MHz for frequency range 1 (FR1), BW of 50 or 100 MHz for frequency range 2 (FR2), reduced number of antennas (e.g. 1Tx antenna, 1 or 2 Rx antenna depending on FR and band), limited peak data rates, restricted modulation levels (e.g. 64 quadrature amplitude modulation (QAM) in downlink (DL) and 16-QAM in uplink (UL)) and/or optional half-duplex frequency division duplex (FDD). RedCap devices may include devices with relatively low complexity, cost, and/or size. Use cases for RedCap UE and example embodiments of the present disclosure may include, but are not limited to, industrial Internet of Things (IoT) sensors, wireless sensors, video surveillance devices, Internet of Things (IoT) devices, wearables, and/or devices used for transportation, tracking, infrastructure, agriculture, smart cities, etc. Wearables may include sensors in contact with or near skin, smart fabric, heart rate monitors, temperature monitors, etc. RedCap UEs might only deploy the minimum number of RF chains (i.e. single RF chain).

RedCap UEs may support half-duplex frequency division duplex (HD-FDD) mode only in some FDD bands due to complexity reduction. SSB measurements may have higher priority than UL transmissions. In particular for such HD-FDD devices, the information reported by the UE to the network may be of critical importance to achieve high scheduling efficiency. For these devices, additional scheduling restrictions apply. In that situation, the same approach used for measurements without gaps using NCSG would not be feasible for measurement objects which require RF re-tuning, as there is no vacant RF chain.

A technical effect of example embodiments of the present disclosure may be to enable a device that does not have a vacant RF chain to perform measurements without gaps in an efficient manner.

A technical effect of example embodiments of the present disclosure may be to enable both UEs with a spare RF chain and RedCap UEs to perform measurements without gaps. A technical effect of example embodiments of the present disclosure may be to enable measurements without gaps for a wide range of UE architectures and configurations.

Figure 2:
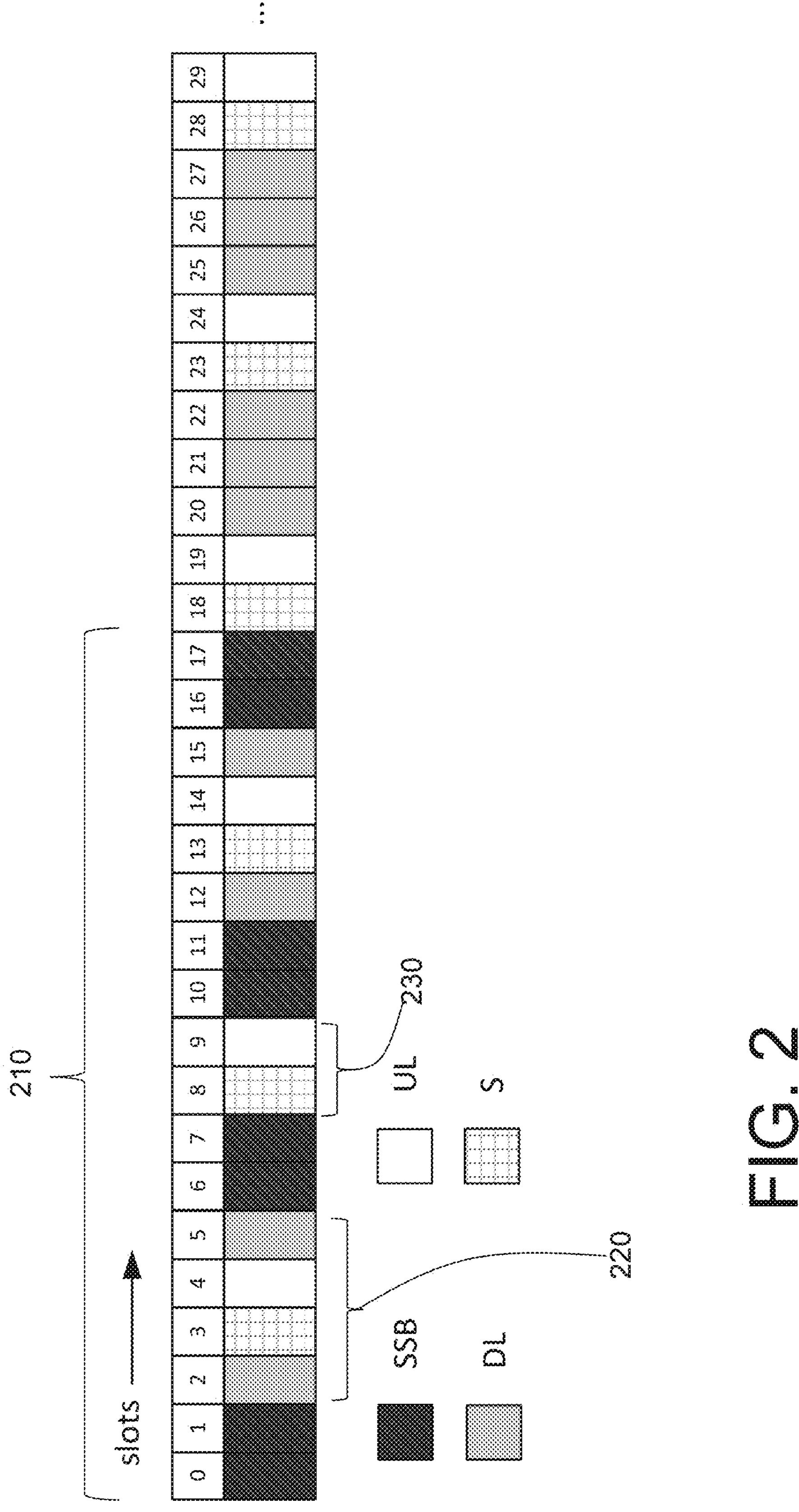
FIG. 2 is a diagram illustrating features as described herein.

Referring now to FIG. 2, illustrated is a frame structure demonstrating the problem of switching between measurements and serving cell in FR2. For simplicity, only one timeline is shown; in reality, the device would be switching between the serving cell and the cell/frequency for the measurement to be performed. In FIG. 2, if measuring an SSB in SFN 0, slot 1, on a cell/frequency to be measured, there must be sufficient time to switch to serving cell RX/TX before any resources (e.g. for DL reception/UL transmission) can be utilized. As this capability is unknown to the network, a non-specified period prior to and after the measurement is at risk to be scheduled, without the device in reality being able to utilize the scheduled resources. This may yield higher error rates and thus additional unnecessary repetitions. Furthermore, if the network has no knowledge about the UE's capability, it may not schedule any radio resources for this UE between SSB measurements, and hence could even waste radio resources or enforce higher latency for data transmissions to be scheduled. Accordingly, the scheduling efficiency of the network will likely be degraded.

Figure 3A:
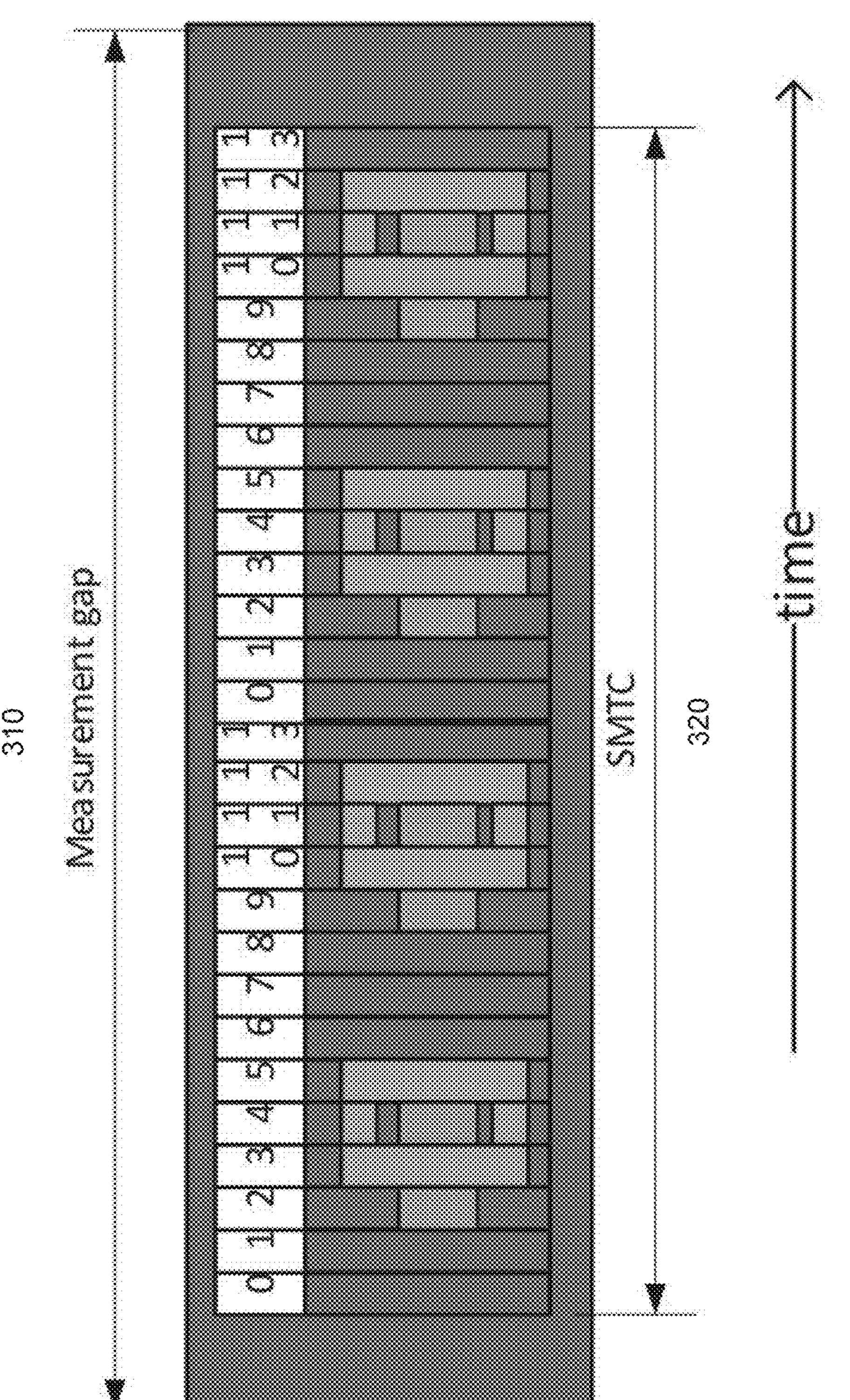
FIG. 3A is a diagram illustrating features as described herein.

Features as described herein may relate to measurements with gaps. Measurements with gaps are performed when the gNB configures gaps for the UE to perform measurements, as shown in FIG. 3A. In this example, the measurement gap (310) is configured to be slightly larger in time than the SSB-based measurement timing configuration (SMTC) period (320). Gaps may be defined as a time window in which the UE is not expected to receive from nor transmit active data to the network, including PDCCH, PDSCH, PUCCH, PUSCH and SRS. The gaps may be configured by RRC. The configurations of a gap include the measurement gap repetition period, the gap length, and the gap offset. Measurement gap length may be as short as 1.5 ms or as long as 20 ms, and the gap repetition period may be as small as 20 ms and as large as 160 ms. As an example, if the UE is performing SSB based L3 measurements, a typical SSB-burst length may be 5 ms, with a repetition of about 80 ms, and the network may configure a gap of 5.5 ms length with 80 ms repetition period to match that SSB-burst.

Figure 3B:
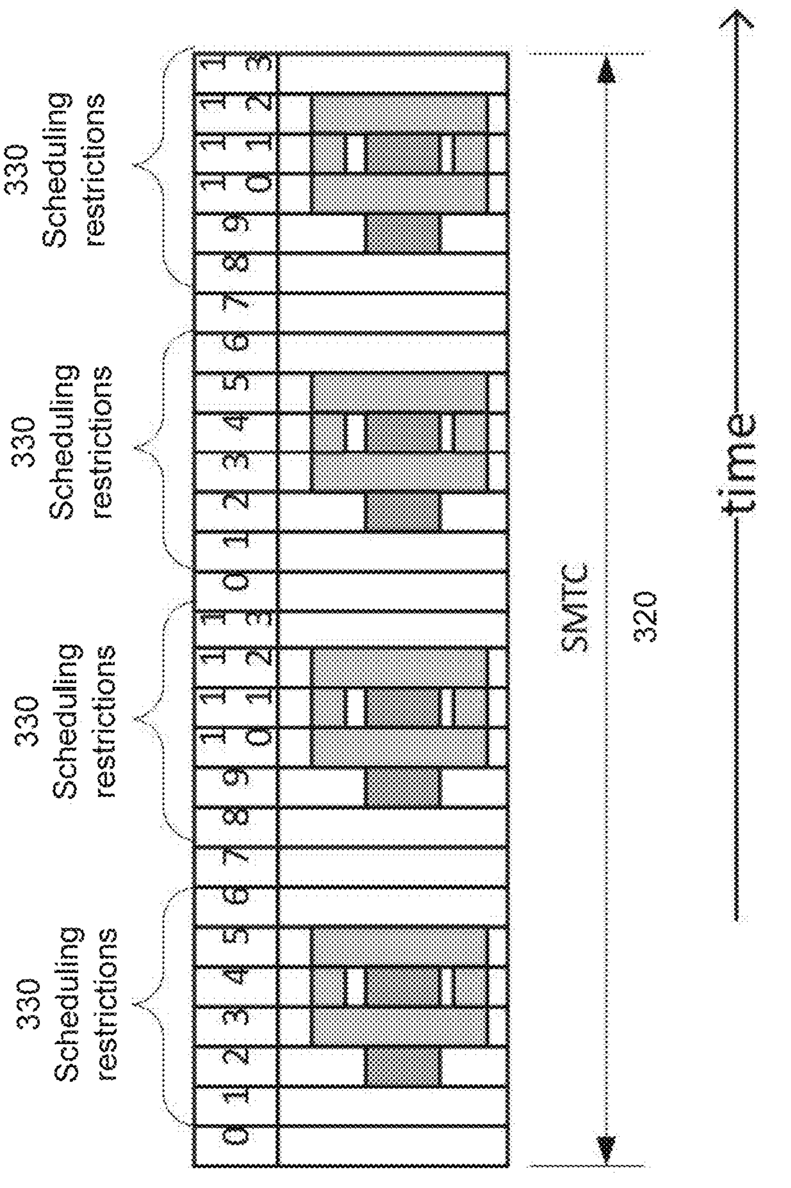
FIG. 3B is a diagram illustrating features as described herein.
Figure 4A:
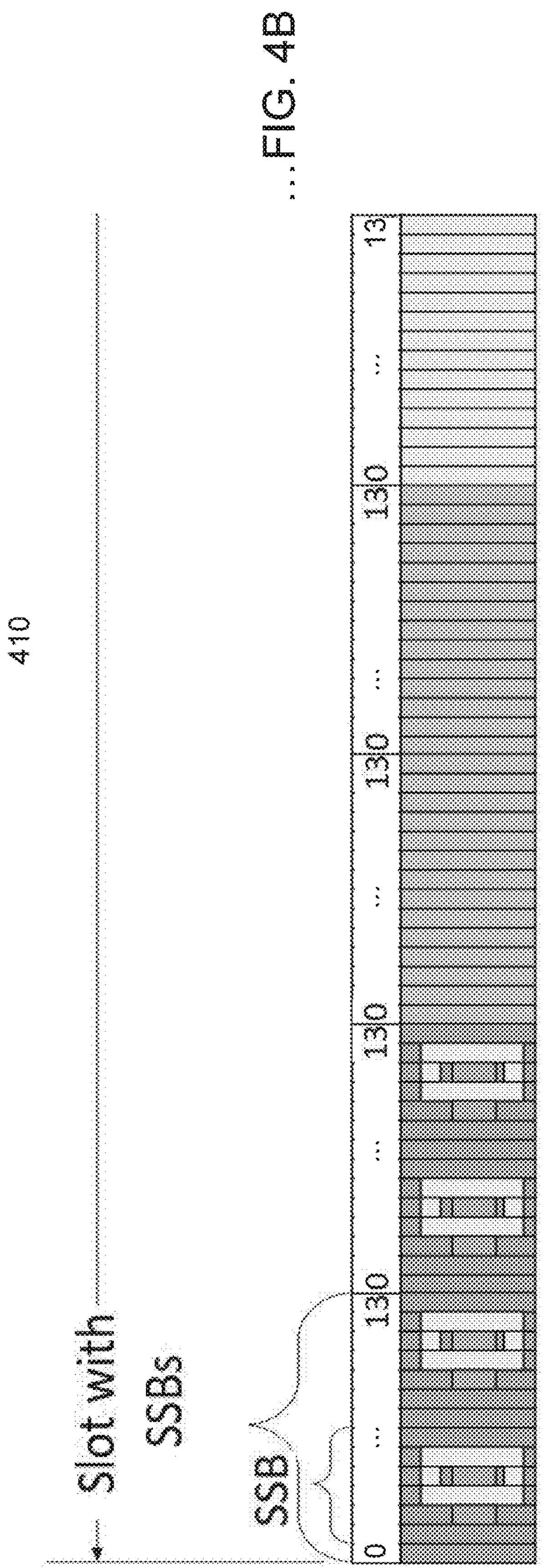
FIG. 4A is a diagram illustrating features as described herein.
Figure 4C:
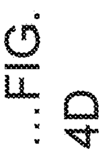
FIG. 4C is a diagram illustrating features as described herein.
Figure 4C:
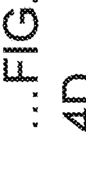
Figure 4C:
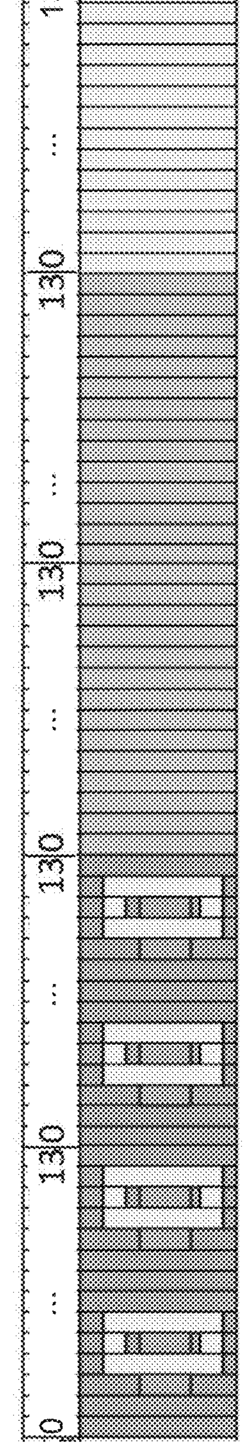

Features as described herein may relate to measurements without gaps. Measurements without gaps are performed without the gaps described above. The big advantage of measurements without gaps is that they cause smaller disruption on the network performance, since the UE is not completely unavailable while performing the measurements, as described in FIG. 3B. In this example, scheduling is restricted (330) within the SMTC (320) around the OFDM symbols to be measured. In comparison to the gaps in FIG. 3A, the measurements without gaps in FIG. 3B provide some scheduling opportunities within the SMTC (320). Typically, intra frequency measurements are the best candidates for measurements without gaps, since the UE can perform such measurements without RF re-tuning. For a measurement without gap, the UE may perform the SSB-based measurements within a configured SMTC window containing the reference signals to be measured (320). Even though gaps are not used for such measurements, there are certain conditions under which the UE is not expected to receive PDCCH/PDSCH during the SSB symbols, and one OFDM symbol before and after the symbols to be measured. Such scheduling restrictions are described in 38.133, clause 9.2.5.

Features as described herein may relate to NCSG. The existing signaling associated with those 2 types of gaps includes UE assistance information.

In Rel-16, the feature needForGaps was introduced for NR. UE assistance information (UAI) may be used for indicating UE support for measurements without gaps. This feature may be configured during the RRCReconfiguration procedure, where the network may send an RRCReconfiguration message including the information element (IE) needForGapsConfigNR, which may include the NR bands for which the UE is requested to report the gap information. In response, the UE may send a RRCReconfigurationComplete message including the IE needForGapsInfoNR, which may include the list of intra-frequency cells for which a measurement gap is needed. The UE may indicate that information, including the gapIndication-r16, to indicate whether "gap" or "no-gap" is required. It may also include the list of inter-frequency bands for which a measurement gap is needed. The network may send to the UE an RRCReconfiguration message including the IE GapConfig if a gap is configured to perform the measurements. In response, the UE may transmit an RRCReconfigurationComplete message.

As in TS 38.331, the NeedForGapsConfigNR information element contains a configuration related to the reporting of measurement gap requirement information. The NeedForCapsInfoNR information element indicates whether a measurement gap is required for the UE to perform SSB based measurements on an NR target band while NR-DC or NE-DC is not configured.

In an example scenario, the UE may not have idle receivers for doing gapless measurements. This may be reasoned by the UE RF architecture (e.g. RedCap UE), or in case of multiple receiver chains, no spare receiver chain being available due as specified up to, for example, full occupation of receivers for CA/DC/MUSIM. In that case, the UE may re-tune the used receiver for the measurement, and then re-tune back to the primary component carrier when the measurement is complete.

As an example, a network may schedule SSB's as shown in FIG. 2, which illustrates an example frame structure of SSB scheduling in a FR2 network. Slots 0 to 7 cover 1 ms.

For the sake of the example in FIG. 2, it may be assumed that the UE is mandated to measure SSBs in slots 0, 1, 6, 7, 10 and 11 according to the configured SMTC period.

An expanded version slots 0 to 17 of FIG. 2 (210) is shown in FIG. 4. FIG. 4 includes FIGS. 4A, 4B, 4C, and 4D, which are to be joined together as illustrated. FIG. 4 illustrates the SMTC period (710) of FIG. 2, and includes a more detailed version of SFN 0, slot 0 to 17 (210).

As can be seen in FIG. 4, there are 4 slots between the second and third occurrence of SSB in SFN 0 (220), but only 2 slots (slot 8 and 9) between fourth and fifth occurrence of SSB (230). This may give the UE a hard choice, whether it is worth re-tuning the receiver for the slot 8 and 9. It may all depend on whether the UE will be able to receive or transmit in those slots while having spent time in the slots for RF re-tuning as well.

In fact, the network may not have knowledge about UE's behavior between successive SSB measurements. In other words, the network may not be able to accurately schedule the UE in the serving cell between SSB occurrences. In an example embodiment, the UE may inform the network about the required time between an intra-/inter-frequency measurement of an SSB occurrence and its availability for DL reception/UL transmission in the serving cell. This may have the technical effect of providing knowledge on the actual usage of resources at the UE side to the network. This may have the technical effect of allowing both the network and the UE to optimize and, thereby, minimize the waste of resources due to continuous interruptions between successive SSB measurements.

Figure 5:
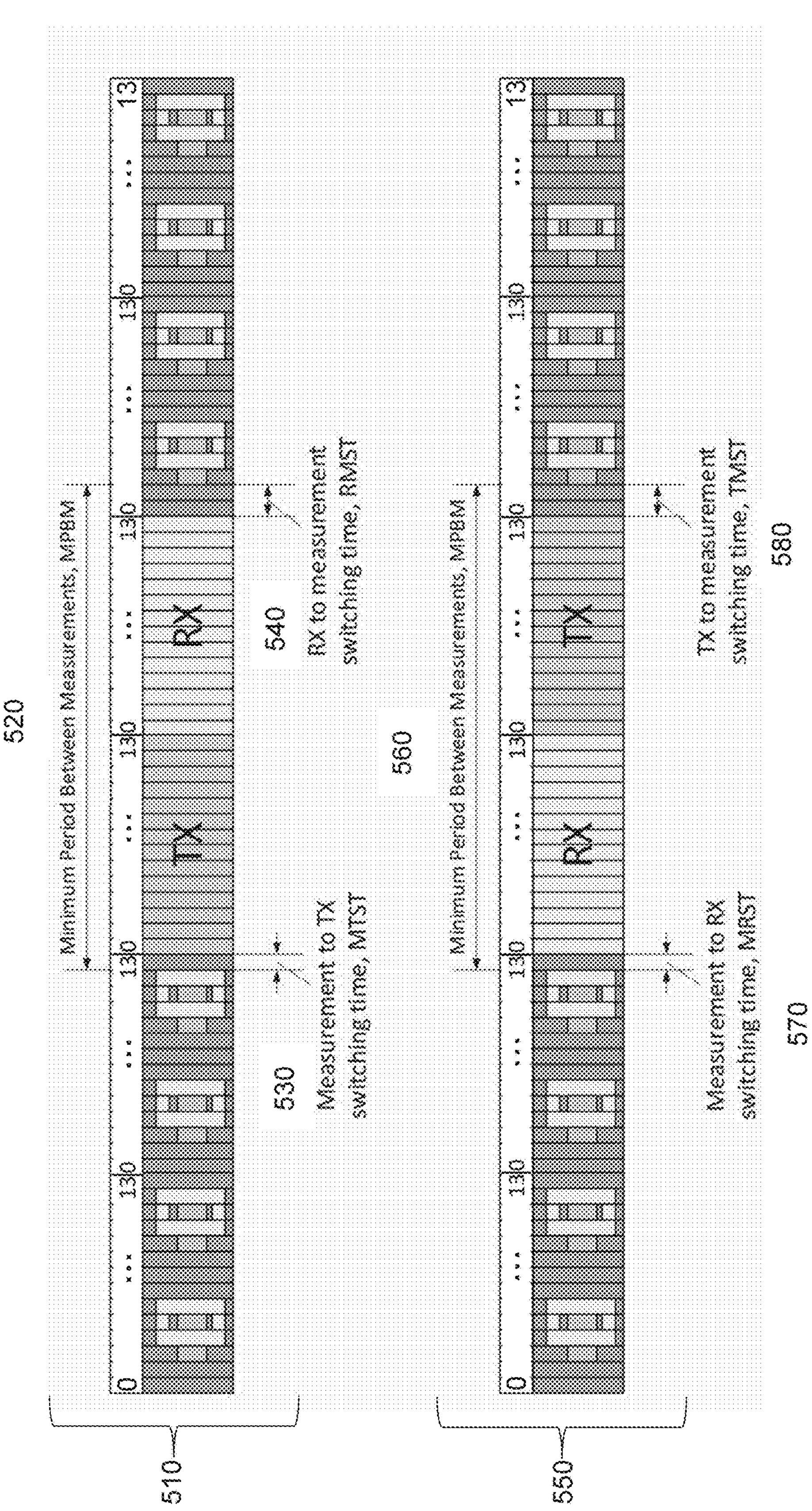
FIG. 5 is a diagram illustrating features as described herein.

Referring now to FIG. 5, illustrated are parameters are according to an example embodiment. At 510 and 550, the focus is on slots 6 to 11 of FIG. 2; the difference between 510 and 550 is that the RX and TX slots are exchanged.

In FIG. 5, the following parameters may be identified.

The minimum period between SSB Measurements (MPBM) may be identified, 520, 560. In an alternative example embodiment, the period between SSB measurements (PBM) may be identified. During the MPBM/PBM, the UE may be scheduled for data reception or data transmission as long as the time between two reference signals to be measured is larger than MPBM/PBM. MPBM/PBM may be defined as the time represented as a number of slots for the device to be able to utilize an entire slot between SSB measurements. Additionally or alternatively, MPBM/PBM may be defined as the time represented as a number of symbols (e.g. X symbols) to be able to utilize X symbols between measurements. Additionally or alternatively, MPBM/PBM may be defined as the time in time units (e.g. ms or us). Additionally or alternatively, MPBM/PBM may be defined as the time in similar units.

The time for the device to switch from a measurement to be able to transmit at the beginning of a symbol, or the measurement to TX switching time (MTST), may be identified, 830. The MTST may be different for intra-vs inter-frequency switching, for intra-vs inter-frequency group switching, for intra-vs inter-frequency range switching, etc.

The time for the device to switch between an RX operation to performing a measurement, or the RX to measurement switching time (RMST), may be identified, 540. The RMST may be different for intra-vs inter-frequency switching, for intra-vs inter-frequency group switching, for intra-vs inter-frequency range switching, etc.

The time for the device to switch from a measurement to be able to receive at the beginning of a symbol, or the measurement to RX switching time (MRST), may be identified, 570. The MRST may be different for intra-vs inter-frequency switching, for intra-vs inter-frequency group switching, for intra-vs inter-frequency range switching, etc.

The time for the device to switch between an TX operation to performing a measurement, or the TX to measurement switching time (TMST), may be identified, 580. The TMST may be different for intra-vs inter-frequency switching, for intra-vs inter-frequency group switching, for intra-vs inter-frequency range switching, etc.

It may be noted that the example given in FIG. 5 shows a set of values for the switching time that may be low. The switching time may be extending into the neighboring slot or even slots. The size of these switching time is based on UE architecture and UE design; the example of FIG. 5 is not limiting.

Figure 6:
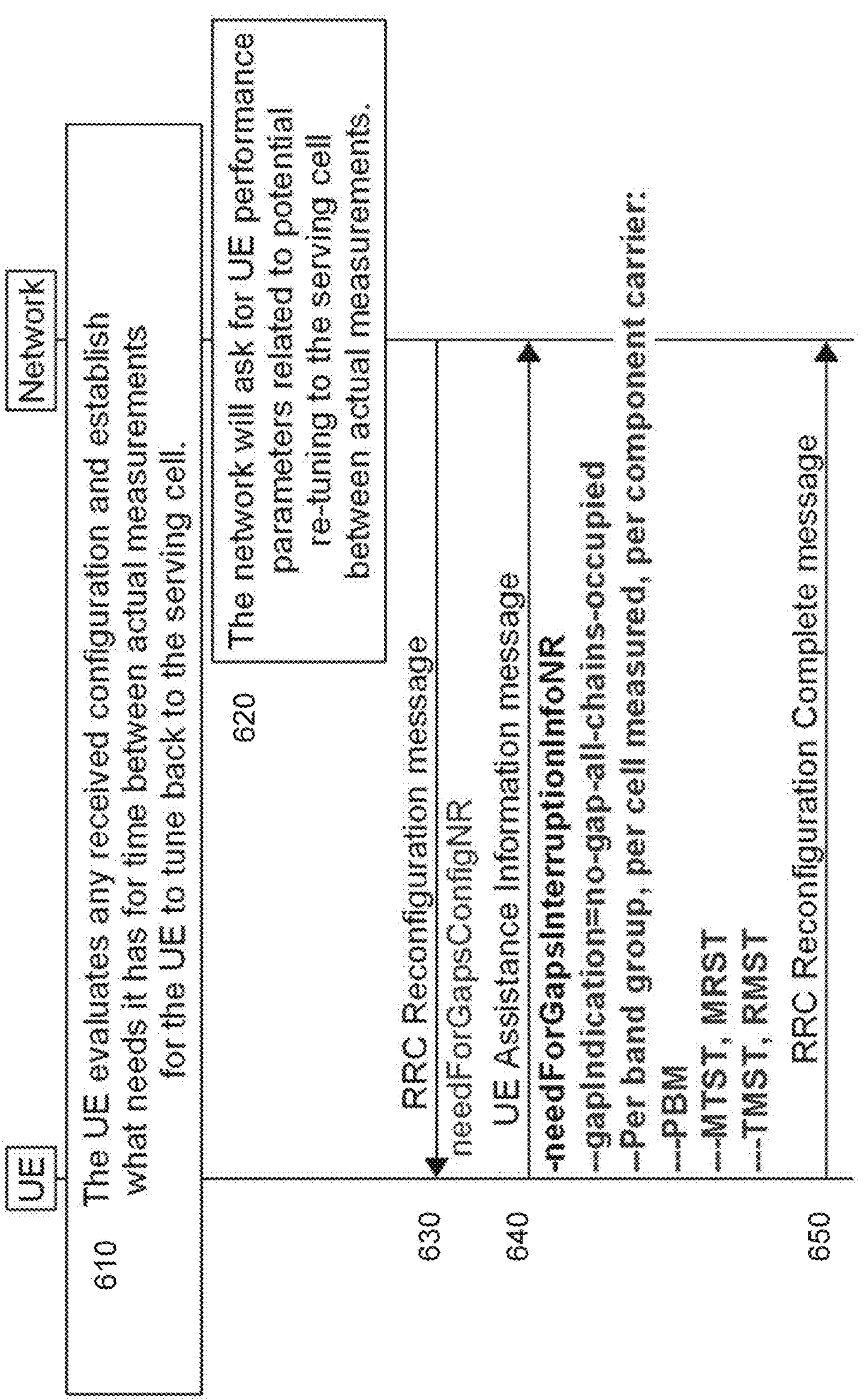
FIG. 6 is a flowchart illustrating steps as described herein.

Referring now to FIG. 6, illustrated is an example method for communicating UE performance parameters with respect to utilizing resource grants between actual measurements. For example, the parameters illustrated in FIG. 5 may be communicated.

At 610, the UE may evaluate any received configuration and establish what needs it has for time between actual measurements for the UE to tune back to the serving cell. At 620, the network may determine to ask for UE performance parameters related to potential re-tuning to the serving cell between actual measurements. At 630, the network may transmit an RRCReconfiguration message to the UE. The RRC configuration may hold a request for the UE to reports its capabilities with respect to measurement gaps and small interruptions. For example, a needForGapsConfigNR IE may be included. At 640, the UE may transmit a UE assistance information message to the network. The UE assistance information message (UAI) may hold one or more of MPBM, MTST, RMST, MRST, and/or TMST (see, e.g., FIG. 5). In an example, these parameters may be provided per band group, per cell measured, and/or per component carrier. These parameters may enable the network to plan resource grants during the periods between SSB measurements, where it can expect the UE to retune back to the serving cell, and thereafter continuing to perform SSB measurements. The UAI may include, for example, needForGapsInterruptionInfoNR IE, gapIndication=no-gap-all-chains-occupied IE, etc. At 650, the UE may transmit an RRC Reconfiguration Complete message to the network.

It may be noted that the ability to provide the suggested parameters may become a UE capability parameter, and that the network may be able to configure whether the UE is allowed to send UAI messages holding this information.

A technical effect of example embodiments of the present disclosure may be to enable a UE that does not have a spare RF chain to perform neighbor cell (SSB or CSI-RS) measurements without gaps. It may be desirable to avoid measurement gaps because they may result in long time windows where the UE is not capable of receiving nor sending data; measurement without gaps may make the 5G system more efficient.

A technical effect of example embodiments of the present disclosure may be to only provide restriction of data reception/transmission around the symbols to be measured. In the example of SSB indexes to be measured within an SMTC, not all the SSB indexes may be configured by the network.

It may be noted that, additionally, some DL only and UL slots may be configured within the SMTC window; that may leave room for communication inside the SMTC window, where the UE may otherwise be blocked in the case of performing measurements with gaps. During the SMTC, the UE may be interrupted for the TMST/RMST before the first OFDM symbol to measure, and between SSB indexes, if the interval between the reference signals is larger than (MTST or MRST)+PBM, the UE might receive data in the interval between measurements. In one alternative implementation, PBM/MPBM is defined such that it already considers MTST/MRST/TMST/RMST.

Example embodiments of the present disclosure may result in updates to both the RAN2 specification and the RAN4 specification.

For example, with respect to TS 38.331, updates to the IE related to gNB configuration of needForGaps may be needed. It may be implemented by either updating the existing gap field in NeedForGapsConfigNR IE with a new flag indicating no-gap without spare RF chain is supported by the gNB, or a new IE similar to NeedForGapsConfigNR may be created to indicate that no-gap without spare RF chain is supported by the gNB. For example, with respect to TS 38.331, updates to UE assistance information related to NeedForGapsNR may be needed. For example, either NeedForGapsInfoNR may be reused, or a new IE may be created. gapIndication may need to include the existing options, gap, no-gap, and no-gap-no-spareRF.

For example, with respect to TS 38.133, requirements for measurements without gaps and without spare RF chain may be created. For example, with respect to TS 38.133, either existing intra- and inter-frequency clauses in 9.2.5 and 9.3.9 may be updated, or new clauses may be created for that purpose. For example, with respect to TS 38.133, RRM requirements may indicate that the interruption applies shortly before and after measuring configured SSB indexes.

FIG. 7 illustrates the potential steps of an example method 700. The example method 700 may include: determining at least one parameter associated with measurement of at least one synchronization signal block, wherein the at least one parameter comprises at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block, 710; and transmitting, to a network entity, the at least one parameter related to a switching time between measurement and transmission or reception, 720. The example method 700 may be performed, for example, with a UE.

FIG. 8 illustrates the potential steps of an example method 800. The example method 800 may include: receiving, from a user equipment, at least one parameter, wherein the at least one parameter is associated with measurement of at least one synchronization block, wherein the at least one parameter comprises at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block, 810; and determining at least one resource grant for the user equipment based, at least partially, on the at least one parameter related to a switching time between measurement and transmission or reception, 820. The example method 800 may be performed, for example, with a base station, eNB, gNB, network, network entity, etc.

In accordance with one example embodiment, an apparatus may comprise: at least one processor; and at least one memory storing instructions that, when executed by the at least one processor, cause the apparatus at least to: determine at least one parameter associated with measurement of at least one synchronization signal block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and transmit, to a network entity, the at least one parameter related to a switching time between measurement and transmission or reception.

The indication of the minimum time period between measurements of synchronization signal blocks may comprise at an indication of at least one of: a number of slots, a number of symbols, or a number of time units.

At least one of the first time period, the second time period, the third time period, or the fourth time period may be associated with at least one of: intra-frequency switching, inter-frequency switching, intra-frequency group switching, inter-frequency group switching, intra-frequency range switching, inter-frequency range switching, a band group, a cell, or a component carrier.

The at least one parameter may be transmitted to the network entity via an assistance information message.

The example apparatus may be further configured to: receive, from the network entity, a radio resource control message comprising a request to report the at least one parameter, wherein the at least one parameter may be transmitted to the network entity in response to the received radio resource control message.

The example apparatus may be further configured to: receive, from the network entity, a capability configuration, wherein the at least one parameter may be transmitted to the network entity in response to the received capability configuration.

The example apparatus may be further configured to: determine that an interval between reference signals is larger than the time period between measurements; and receive and/or transmit data during the interval.

In accordance with one aspect, an example method may be provided comprising: determining, with a user equipment, at least one parameter associated with measurement of at least one synchronization signal block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and transmitting, to a network entity, the at least one parameter related to a switching time between measurement and transmission or reception.

The indication of the minimum time period between measurements of synchronization signal blocks may comprise at an indication of at least one of: a number of slots, a number of symbols, or a number of time units.

At least one of the first time period, the second time period, the third time period, or the fourth time period may be associated with at least one of: intra-frequency switching, inter-frequency switching, intra-frequency group switching, inter-frequency group switching, intra-frequency range switching, inter-frequency range switching, a band group, a cell, or a component carrier.

The at least one parameter may be transmitted to the network entity via an assistance information message.

The example method may further comprise: receiving, from the network entity, a radio resource control message comprising a request to report the at least one parameter, wherein the at least one parameter may be transmitted to the network entity in response to the received radio resource control message.

The example method may further comprise: receiving, from the network entity, a capability configuration, wherein the at least one parameter may be transmitted to the network entity in response to the received capability configuration.

The example method may further comprise: determining that an interval between reference signals is larger than the time period between measurements; and receiving and/or transmitting data during the interval.

In accordance with one example embodiment, an apparatus may comprise: circuitry configured to perform: determining, with a user equipment, at least one parameter associated with measurement of at least one synchronization signal block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and circuitry configured to perform: transmitting, to a network entity, the at least one parameter related to a switching time between measurement and transmission or reception.

In accordance with one example embodiment, an apparatus may comprise: processing circuitry; memory circuitry including computer program code, the memory circuitry and the computer program code configured to, with the processing circuitry, enable the apparatus to: determine at least one parameter associated with measurement of at least one synchronization signal block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and transmit, to a network entity, the at least one parameter related to a switching time between measurement and transmission or reception.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: determining at least one parameter associated with measurement of at least one synchronization signal block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and transmitting, to a network entity, the at least one parameter related to a switching time between measurement and transmission or reception.

The indication of the minimum time period between measurements of synchronization signal blocks may comprise an indication of at least one of: a number of slots, a number of symbols, or a number of time units.

At least one of the first time period, the second time period, the third time period, or the fourth time period may be associated with at least one of: intra-frequency switching, inter-frequency switching, intra-frequency group switching, inter-frequency group switching, intra-frequency range switching, inter-frequency range switching, a band group, a cell, or a component carrier.

The at least one parameter may be transmitted to the network entity via an assistance information message.

The means may be further configured to perform: receiving, from the network entity, a radio resource control message comprising a request to report the at least one parameter, wherein the at least one parameter may be transmitted to the network entity in response to the received radio resource control message.

The means may be further configured to perform: receiving, from the network entity, a capability configuration, wherein the at least one parameter may be transmitted to the network entity in response to the received capability configuration.

The means may be further configured to perform: determining that an interval between reference signals is larger than the time period between measurements; and receiving and/or transmitting data during the interval.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: determine at least one parameter associated with measurement of at least one synchronization signal block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and cause transmitting, to a network entity, of the at least one parameter related to a switching time between measurement and transmission or reception.

In accordance with one example embodiment, a non-transitory computer-readable medium comprising program instructions stored thereon for performing at least the following: determining at least one parameter associated with measurement of at least one synchronization signal block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and causing transmitting, to a network entity, of the at least one parameter related to a switching time between measurement and transmission or reception.

In accordance with another example embodiment, a non-transitory program storage device readable by a machine may be provided, tangibly embodying instructions executable by the machine for performing operations, the operations comprising: determining at least one parameter associated with measurement of at least one synchronization signal block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and causing transmitting, to a network entity, of the at least one parameter related to a switching time between measurement and transmission or reception.

In accordance with another example embodiment, a non-transitory computer-readable medium comprising instructions that, when executed by an apparatus, cause the apparatus to perform at least the following: determining at least one parameter associated with measurement of at least one synchronization signal block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and causing transmitting, to a network entity, of the at least one parameter related to a switching time between measurement and transmission or reception.

A computer implemented system comprising: at least one processor and at least one non-transitory memory storing instructions that, when executed by the at least one processor, cause the system at least to perform: determining at least one parameter associated with measurement of at least one synchronization signal block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and causing transmitting, to a network entity, of the at least one parameter related to a switching time between measurement and transmission or reception.

A computer implemented system comprising: means for determining at least one parameter associated with measurement of at least one synchronization signal block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and means for causing transmitting, to a network entity, of the at least one parameter related to a switching time between measurement and transmission or reception.

In accordance with one example embodiment, an apparatus may comprise: at least one processor; and at least one memory storing instructions that, when executed by the at least one processor, cause the apparatus at least to: receive, from a user equipment, at least one parameter, wherein the at least one parameter may be associated with measurement of at least one synchronization block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determine at least one resource grant for the user equipment based, at least partially, on the at least one parameter related to a switching time between measurement and transmission or reception.

The indication of the minimum time period between measurements of synchronization signal blocks may comprise an indication of at least one of: a number of slots, a number of symbols, or a number of time units.

At least one of the first time period, the second time period, the third time period, or the fourth time period may be associated with at least one of: intra-frequency switching, inter-frequency switching, intra-frequency group switching, inter-frequency group switching, intra-frequency range switching, inter-frequency range switching, a band group, a cell, or a component carrier.

The at least one parameter may be received from the user equipment via an assistance information message.

The example apparatus may be further configured to: transmit, to the user equipment, a radio resource control message comprising a request to report the at least one parameter.

The example apparatus may be further configured to: transmit, to the user equipment, a capability configuration, wherein the at least one parameter may be received in response to the capability configuration.

In accordance with one aspect, an example method may be provided comprising: receiving, from a user equipment, at least one parameter, wherein the at least one parameter may be associated with measurement of at least one synchronization block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determining at least one resource grant for the user equipment based, at least partially, on the at least one parameter related to a switching time between measurement and transmission or reception.

The indication of the minimum time period between measurements of synchronization signal blocks may comprise an indication of at least one of: a number of slots, a number of symbols, or a number of time units.

At least one of the first time period, the second time period, the third time period, or the fourth time period may be associated with at least one of: intra-frequency switching, inter-frequency switching, intra-frequency group switching, inter-frequency group switching, intra-frequency range switching, inter-frequency range switching, a band group, a cell, or a component carrier.

The at least one parameter may be received from the user equipment via an assistance information message.

The example method may further comprise: transmitting, to the user equipment, a radio resource control message comprising a request to report the at least one parameter.

The example method may further comprise: transmitting, to the user equipment, a capability configuration, wherein the at least one parameter may be received in response to the capability configuration.

In accordance with one example embodiment, an apparatus may comprise: circuitry configured to perform: receiving, from a user equipment, at least one parameter, wherein the at least one parameter may be associated with measurement of at least one synchronization block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and circuitry configured to perform: determining at least one resource grant for the user equipment based, at least partially, on the at least one parameter related to a switching time between measurement and transmission or reception.

In accordance with one example embodiment, an apparatus may comprise: processing circuitry; memory circuitry including computer program code, the memory circuitry and the computer program code configured to, with the processing circuitry, enable the apparatus to: receive, from a user equipment, at least one parameter, wherein the at least one parameter may be associated with measurement of at least one synchronization block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determine at least one resource grant for the user equipment based, at least partially, on the at least one parameter related to a switching time between measurement and transmission or reception.

In accordance with one example embodiment, an apparatus may comprise means for performing: receiving, from a user equipment, at least one parameter, wherein the at least one parameter may be associated with measurement of at least one synchronization block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determining at least one resource grant for the user equipment based, at least partially, on the at least one parameter related to a switching time between measurement and transmission or reception.

The indication of the minimum time period between measurements of synchronization signal blocks may comprise an indication of at least one of: a number of slots, a number of symbols, or a number of time units.

At least one of the first time period, the second time period, the third time period, or the fourth time period may be associated with at least one of: intra-frequency switching, inter-frequency switching, intra-frequency group switching, inter-frequency group switching, intra-frequency range switching, inter-frequency range switching, a band group, a cell, or a component carrier.

The at least one parameter may be received from the user equipment via an assistance information message.

The means may be further configured to perform: transmitting, to the user equipment, a radio resource control message comprising a request to report the at least one parameter.

The means may be further configured to perform: transmitting, to the user equipment, a capability configuration, wherein the at least one parameter may be received in response to the capability configuration.

In accordance with one example embodiment, a non-transitory computer-readable medium comprising instructions stored thereon which, when executed with at least one processor, cause the at least one processor to: cause receiving of at least one parameter, wherein the at least one parameter may be associated with measurement of at least one synchronization block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determine at least one resource grant for the user equipment based, at least partially, on the at least one parameter related to a switching time between measurement and transmission or reception.

In accordance with one example embodiment, a non-transitory computer-readable medium comprising program instructions stored thereon for performing at least the following: causing receiving of at least one parameter, wherein the at least one parameter may be associated with measurement of at least one synchronization block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determining at least one resource grant for the user equipment based, at least partially, on the at least one parameter related to a switching time between measurement and transmission or reception.

In accordance with another example embodiment, a non-transitory program storage device readable by a machine may be provided, tangibly embodying instructions executable by the machine for performing operations, the operations comprising: causing receiving of at least one parameter, wherein the at least one parameter may be associated with measurement of at least one synchronization block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determining at least one resource grant for the user equipment based, at least partially, on the at least one parameter related to a switching time between measurement and transmission or reception.

In accordance with another example embodiment, a non-transitory computer-readable medium comprising instructions that, when executed by an apparatus, cause the apparatus to perform at least the following: causing receiving of at least one parameter, wherein the at least one parameter may be associated with measurement of at least one synchronization block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determining at least one resource grant for the user equipment based, at least partially, on the at least one parameter related to a switching time between measurement and transmission or reception.

A computer implemented system comprising: at least one processor and at least one non-transitory memory storing instructions that, when executed by the at least one processor, cause the system at least to perform: causing receiving of at least one parameter, wherein the at least one parameter may be associated with measurement of at least one synchronization block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and determining at least one resource grant for the user equipment based, at least partially, on the at least one parameter related to a switching time between measurement and transmission or reception.

A computer implemented system comprising: means for causing receiving of at least one parameter, wherein the at least one parameter may be associated with measurement of at least one synchronization block, wherein the at least one parameter may comprise at least one of: an indication of a time period between measurements of synchronization signal blocks, an indication of a minimum time period between measurements of synchronization signal blocks, an indication of a first time period to switch from measurement of a synchronization signal block to transmission, an indication of a second time period to switch from reception to measurement of the synchronization signal block, an indication of a third time period to switch from measurement of the synchronization signal block to reception, or an indication of a fourth time period to switch from transmission to measurement of the synchronization signal block; and means for determining at least one resource grant for the user equipment based, at least partially, on the at least one parameter related to a switching time between measurement and transmission or reception.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus, comprising:

at least one processor; and at least one non-transitory memory storing instructions that, when executed by the at least one processor, cause the apparatus at least to:

receive, from a reduced capability (RedCap) user equipment (UE) that comprises a single radio frequency (RF) chain and operates in half-duplex frequency division duplex (HD-FDD) mode, a plurality of parameters expressed in a number of orthogonal frequency division multiplexing (OFDM) symbols, wherein the plurality of parameters are associated with synchronization signal block (SSB) measurements performed in frequency range 2 (FR2), and wherein the plurality of parameters comprise:

a period between SSB measurements (PBM), a minimum period between SSB measurements (MPBM), a measurement-to-transmission switching time (MTST), a reception-to-measurement switching time (RMST), a measurement-to-reception switching time (MRST), and
a transmission-to-measurement switching time (TMST);
determine a radio resource grant for the RedCap UE in a slot between consecutive SSB measurements, wherein determining the radio resource grant comprises:
identifying a candidate interval between two successive SSBs;
verifying that the candidate interval is larger than a sum of at least one of the MTST, RMST, MRST, or TMST and the MPBM;
excluding OFDM symbols corresponding to the SSB measurement and at least one symbol before and after the SSB measurement from scheduling; and
allocating the radio resource grant only to remaining OFDM symbols in the candidate interval; and
using the determined radio resource grant:
schedule physical downlink shared channel (PDSCH), physical downlink control channel (PDCCH), physical uplink shared channel (PUSCH), physical uplink control channel (PUCCH), and sounding reference signal (SRS) transmissions only in intervals where the RedCap UE can transmit or receive; and
prevent downlink and uplink traffic from being scheduled for the RedCap UE during OFDM symbols reserved for SSB measurement and guard symbols before and after the SSB measurement.

2. The apparatus of claim 1, wherein the plurality of parameters are received in a needForGapsInterruptionInfoNR information element included in a UE assistance information message.

3. The apparatus of claim 2, wherein the MTST, RMST, MRST, and TMST are each defined for intra-frequency and inter-frequency switching separately.

4. The apparatus of claim 3, wherein verifying that the candidate interval is larger than the sum further comprises comparing the interval to a value expressed as a number of OFDM symbols.

5. The apparatus of claim 4, wherein the apparatus is further configured to transmit, to the RedCap UE, a radio resource control (RRC) reconfiguration message comprising a confirmation of the determined radio resource grant.

6. The apparatus of claim 5, wherein the apparatus is further configured to allocate the radio resource grant across a plurality of component carriers based on the received parameters.

7. A system, comprising:
at least one processor; and
at least one non-transitory memory storing instructions that, when executed by the at least one processor, cause the system at least to:
receive, from a reduced capability (RedCap) user equipment (UE) that comprises a single radio frequency (RF) chain and operates in half-duplex frequency division duplex (HD-FDD) mode, a plurality of parameters expressed in a number of orthogonal frequency division multiplexing (OFDM) symbols, wherein the plurality of parameters are associated with synchronization signal block (SSB) measurements performed in frequency range 2 (FR2), and wherein the plurality of parameters comprise:
a period between SSB measurements (PBM),
a minimum period between SSB measurements (MPBM),
a measurement-to-transmission switching time (MTST),
a reception-to-measurement switching time (RMST),
a measurement-to-reception switching time (MRST), and
a transmission-to-measurement switching time (TMST);
determine a radio resource grant for the RedCap UE in a slot between consecutive SSB measurements, wherein determining the radio resource grant comprises:
identifying a candidate interval between two successive SSBs;
verifying that the candidate interval is larger than a sum of at least one of the MTST, RMST, MRST, or TMST and the MPBM;
excluding OFDM symbols corresponding to the SSB measurement and at least one symbol before and after the SSB measurement from scheduling; and
allocating the radio resource grant only to remaining OFDM symbols in the candidate interval; and
using the determined radio resource grant:
schedule physical downlink shared channel (PDSCH), physical downlink control channel (PDCCH), physical uplink shared channel (PUSCH), physical uplink control channel (PUCCH), and sounding reference signal (SRS) transmissions only in intervals where the RedCap UE can transmit or receive; and
prevent downlink and uplink traffic from being scheduled for the RedCap UE during OFDM symbols reserved for SSB measurement and guard symbols before and after the SSB measurement.

8. The system of claim 7, wherein the plurality of parameters are received in a needForGapsInterruptionInfoNR information element included in a UE assistance information message.

9. The system of claim 8, wherein the MTST, RMST, MRST, and TMST are each defined for intra-frequency and inter-frequency switching separately.

10. The system of claim 9, wherein verifying that the candidate interval is larger than the sum further comprises comparing the interval to a value expressed as a number of OFDM symbols.

11. The system of claim 10, wherein the system is further configured to transmit, to the RedCap UE, a radio resource control (RRC) reconfiguration message comprising a confirmation of the determined radio resource grant.

12. The system of claim 11, wherein the system is further configured to allocate the radio resource grant across a plurality of component carriers based on the received parameters.

13. The system of claim 12, wherein the system is further configured to store the plurality of parameters in association with a UE context for use in subsequent scheduling rounds.

14. A method, comprising:
receiving, from a reduced capability (RedCap) user equipment (UE) that comprises a single radio frequency (RF) chain and operates in half-duplex frequency division duplex (HD-FDD) mode, a plurality of parameters expressed in a number of orthogonal frequency division multiplexing (OFDM) symbols, wherein the plurality of parameters are associated with synchronization signal block (SSB) measurements performed in frequency range 2 (FR2), and wherein the plurality of parameters comprise:
a period between SSB measurements (PBM),
a minimum period between SSB measurements (MPBM),
a measurement-to-transmission switching time (MTST),
a reception-to-measurement switching time (RMST),
a measurement-to-reception switching time (MRST), and
a transmission-to-measurement switching time (TMST);
determining a radio resource grant for the RedCap UE in a slot between consecutive SSB measurements, wherein determining the radio resource grant comprises:

identifying a candidate interval between two successive SSBs;

verifying that the candidate interval is larger than a sum of at least one of the MTST, RMST, MRST, or TMST and the MPBM;

excluding OFDM symbols corresponding to the SSB measurement and at least one symbol before and after the SSB measurement from scheduling; and allocating the radio resource grant only to remaining OFDM symbols in the candidate interval; and using the determined radio resource grant to:

schedule physical downlink shared channel (PDSCH), physical downlink control channel (PDCCH), physical uplink shared channel (PUSCH), physical uplink control channel (PUCCH), and sounding reference signal (SRS) transmissions only in intervals where the RedCap UE can transmit or receive; and prevent downlink and uplink traffic from being scheduled for the RedCap UE during OFDM symbols reserved for SSB measurement and guard symbols before and after the SSB measurement.

15. The method of claim 14, wherein the plurality of parameters are received in a needForGapsInterruptionInfoNR information element included in a UE assistance information message.

16. The method of claim 15, wherein the MTST, RMST, MRST, and TMST are each defined for intra-frequency and inter-frequency switching separately.

17. The method of claim 16, wherein verifying that the candidate interval is larger than the sum further comprises comparing the interval to a value expressed as a number of OFDM symbols.

18. The method of claim 17, further comprising transmitting, to the RedCap UE, a radio resource control (RRC) reconfiguration message comprising a confirmation of the determined radio resource grant.

19. The method of claim 18, further comprising allocating the radio resource grant across a plurality of component carriers based on the received parameters.

20. The method of claim 19, further comprising storing the plurality of parameters in association with a UE context for use in subsequent scheduling rounds.

* * * * *